United States Patent
Doshi et al.

(10) Patent No.: US 8,520,680 B1
(45) Date of Patent: Aug. 27, 2013

(54) ADDRESS LEARNING IN A LAYER TWO BRIDGING NETWORK

(75) Inventors: Sanjiv Doshi, San Jose, CA (US); Iswar Biswal, San Jose, CA (US); Kumar Mehta, Cupertino, CA (US); Jagadish Grandhi, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 533 days.

(21) Appl. No.: 12/771,451

(22) Filed: Apr. 30, 2010

Related U.S. Application Data

(60) Provisional application No. 61/318,158, filed on Mar. 26, 2010.

(51) Int. Cl.
*H04L 12/28* (2006.01)
*H04L 12/56* (2006.01)

(52) U.S. Cl.
USPC ........... 370/392; 370/389; 370/390; 370/391; 370/395.53; 370/397

(58) Field of Classification Search
None
See application file for complete search history.

(56) References Cited

U.S. PATENT DOCUMENTS

| | | | |
|---|---|---|---|
| 6,639,901 B1 | 10/2003 | Katzri et al. | |
| 7,653,933 B2 | 1/2010 | Miao | |
| 7,724,745 B1 * | 5/2010 | Elangovan et al. | 370/392 |
| 7,856,659 B2 | 12/2010 | Keeler et al. | |
| 8,005,081 B2 * | 8/2011 | Bragg et al. | 370/389 |
| 8,072,984 B2 | 12/2011 | Chang | |
| 8,160,071 B2 * | 4/2012 | Ra et al. | 370/392 |
| 2005/0013295 A1 | 1/2005 | Regan et al. | |
| 2006/0098581 A1 | 5/2006 | Kenghe | |
| 2007/0253326 A1 | 11/2007 | Saha et al. | |
| 2007/0253432 A1 | 11/2007 | Regale et al. | |
| 2008/0159309 A1 * | 7/2008 | Sultan et al. | 370/401 |
| 2008/0212595 A1 * | 9/2008 | Figueira et al. | 370/401 |
| 2009/0122801 A1 | 5/2009 | Chang | |
| 2009/0141622 A1 | 6/2009 | Bitar | |
| 2010/0039934 A1 | 2/2010 | McGuire et al. | |
| 2012/0106321 A1 | 5/2012 | Alon et al. | |

OTHER PUBLICATIONS

Bottorff, "MEF Technical Activities," PPT PowerPoint presentation, Metro Ethernet Forum, IEEE, Mar. 12, 2003, 33 pp.
Bottorff et al., "Carrier Scale Ethernet: Scaling Provider Ethernet," IEEE Communications Magazine, Sep. 2008, pp. 104-109.

(Continued)

*Primary Examiner* — Hassan Phillips
*Assistant Examiner* — Lonnie Sweet
(74) *Attorney, Agent, or Firm* — Shumaker & Sieffert, P.A.

(57) ABSTRACT

A network system includes a provider backbone bridged network (PBBN) and a multi-homed provider bridge network (PBN) having an L2 switch that operate as backboned edge bridge (BEBs) to bridge L2 packets between the PBN and the PBBN. The L2 switch executes a PBBN routing instance and a separate PBN routing instance. A plurality of packet-forwarding engine (PFE) of the L2 switch are configured to forward L2 packets between interfaces of the PBN routing instance and the PBBN routing instance. The PFEs store L2 network address tables that specify L2 network addresses reachable by the interfaces. The PFEs of the L2 switch are configured to selectively share L2 network addresses between the L2 network address tables of the PBN routing instance and the L2 network address tables of the PBBN routing instance.

19 Claims, 7 Drawing Sheets

(56) References Cited

OTHER PUBLICATIONS

IEEE P802.1ah-2008, "Standard for Local and Metropolitan Area Networks—Virtual Bridged Local Area Networks—Amendment 6: Provider Backbone Bridges," Institute of Electrical and Electronics Engineers, Inc., Mar. 26, 2008, 116 pp.

"Metro Ethernet," Wikipedia, last updated Sep. 17, 2010, 6 pp., http://en.wikipedia.org/wiki/Metro_Ethernet.

Sultan, Huawei Technologies, Inc., "PBBN in the Data Center," presented at the IEEE 802.1 Interim Meeting, Pittsburgh, PA, May 18-21, 2009, 3 pp.

U.S. Appl. No. 12/827,464, by Sanjiv Doshi, filed Jun. 30, 2010.

U.S. Appl. No. 12/901,985, by Krishna Sankaran, filed Oct. 11, 2010.

* cited by examiner

ADDRESS LEARNING IN A LAYER TWO BRIDGING NETWORK

This application claims the benefit of U.S. Provisional Application No. 61/318,158, filed Mar. 26, 2010, the entire contents of which are incorporated by reference herein.

TECHNICAL FIELD

The invention relates to electronic computer networks and, more specifically, to layer two (L2) computer networks.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 networks is an Ethernet network in which end point devices (e.g., servers, printers, computers) are connected by one or more Ethernet switches. The Ethernet switches forward Ethernet frames, also referred to as L2 communications or L2 packets to devices within the network. As the Ethernet switches forward the Ethernet frames the Ethernet switches learn L2 state information for the L2 network, including media access control (MAC) addressing information for the devices within the network and the physical ports through which the devices are reachable. The Ethernet switches typically store the MAC addressing information in MAC tables. When forwarding an individual Ethernet frame, an ingress port of an Ethernet switch typically broadcasts the Ethernet frame to all of the other physical ports of the switch unless the Ethernet switch has learned the specific physical port through which to the destination MAC address devices is reachable. In this case, the Ethernet switch forwards a single copy of the Ethernet frame out the associated physical port.

Recently, network service providers have offered systems that provide L2 connectivity between multiple, geographically separate L2 customer networks. That is, the L2 customer networks may be interconnected by the service provider to provide L2 connectivity as if the L2 customer networks were directly connected. One mechanism by which network service providers provide L2 connectivity to their customers is by utilization of Virtual Local Area Networks (VLANs). VLANs are a generic grouping mechanism for Ethernet packets that allow logical isolation of multiple L2 networks that share the same physical Ethernet ports. In other words, a service provider may associate different VLANs with different customers so that L2 traffic and L2 state information for the networks, e.g., MAC addressing information, is logically separate for the customers. VLANs allow network switches and other infrastructure of the service provider to multiplex the L2 customer traffic over shared physical Ethernet ports. In this way, each VLAN provides a connection between devices assigned to the VLAN, and each of the VLANs may essentially be treated as an independent layer two (L2) network. A device assigned to one VLAN can communicate with other devices on that VLAN but may be unable to communicate with devices on a separate VLAN. L2 packets for different VLANs may be correctly forwarded within a network by appending a VLAN tag to the packets to designate the VLAN to which each packet belongs.

One type of large area L2 network connectivity being developed is Provider Backbone Bridging (PBB) defined in accordance with IEEE standard 802.1ah. PBB defines architecture and bridging protocols in which a Provider Backbone Bridged Network (PBBN) provides L2 connectivity between multiple provider bridge networks (PBN) of one or more different network service providers. Such large area L2 network connectivity is being deployed, for example, in metropolitan area networks. Each PBN provides one or more service VLANs ("S-VLANS") to service and isolate L2 traffic from customer network. The PBBN typically includes a set of Backbone Edge Bridges (BEBs) that interconnects some or all of the S-VLANs supported by multiple PBNs. Each BEB provides interfaces that further encapsulate L2 frames for transport through the PBBN. The VLANs used to encapsulate L2 frames from the PBNs and transport the L2 traffic through the PBBN are known as backbone VLANs (B-VLANs), and the resources that support those VLANs are usually considered to be part of the PBBN. In this way, the PBBN may be referred to as a Virtual Bridged Local Area Network under the administrative control of a backbone provider. Further details of PBB can be found in Institute of Electrical and Electronics Engineers, Inc., IEEE P802.1ah-2008, "Standard for Local and Metropolitan Area Networks—Virtual Bridged Local Area Networks—Amendment 6: Provider Backbone Bridges," hereby incorporated by reference in its entirety.

SUMMARY

In general, techniques are described for improving address learning by devices that perform bridging services within an L2 bridging network. For example, the techniques may be applied in network in which an L2 provider bridge network (PBN) is coupled to a provider backbone bridge network (PBBN) using devices that operate as backbone edge bridges (BEBs). Moreover, the techniques may be applied to devices in which components functioning in a domain of a PBN coexist with components functioning with a backbone domain of the PBBN.

For example, each of the PBNs may have one or more L2 switches that operate as BEBs to bridges L2 packets between the PBN and the PBBN. In some cases, routing and forwarding functionality between the domains of the PBN and the PBBN may be logicality separated within the L2 switch in self-contained routing instances. The logically-isolated routing instances, including the hardware components, software components, and state information associated therewith, within the network device may be collectively referred to herein as a separate domain. Learning of L2 state information within the L2 switch, both in hardware and software components, is logically isolated to the domain in which components functions.

In some embodiment, the PBN and the PBBN components of the network device may be implemented as separate routing instances that are logically connected within the network device by a set of logical interfaces. In general, the hardware and software components of each of the routing instances learns L2 network addresses only for the routing instances with which they are associated. As described herein, the network device "leaks" L2 network address information between the otherwise logically isolated components assigned to and controlled by the routing instances of the PBN and PBBN within the network device. The L2 network address information may be leaked in a control plane of the network device or between packet-forwarding components that service interfaces of the routing instances. Moreover, the L2 network address information may be leaked between the components of the routing instances in a constrained manner. For example, the techniques described herein may identify a reduced set of interfaces and other components within each routing instance to which the L2 network addresses are to be propagated such that the addresses can be used locally for inbound L2 traffic to determine where the destination interface lies The techniques may be particularly useful in complex network devices having a plurality of line cards, each of the line cards having potentially multiple packet-forwarding engines (PFEs), where each of the PFEs may have multiple processors and multiple physical interface cards. In such case, the techniques may be used by the network device to identify the specific PFEs of a PBN routing instance to which L2 network addresses are to be installed from the PBBN routing instance. Similarly, the techniques may be used by the network device to identify the specific PFEs of a PBBN routing instance to which L2 network addresses are to be installed from the PBN routing instance. The set of identified PFEs may then be used for both hardware-based and software-based learning within the network device.

The invention may provide one or more advantages. For example, the techniques may allow a network device to provide bridging services between two L2 domains while performing all L2 network address lookups for an Ethernet frame at single point within the forwarding process, e.g., at the ingress interface of the network device. In other words, constrained leaking of L2 network address information between the PBN and PBBN routing instances may allow a single lookup for both an outer bridge-domain L2 network address and an inner PBN-domain L2 network address using a L2 network address table associated with a forwarded component controlled by only one of the routing instances. As such, data forwarding rates may be increased. Moreover, the constrained leaking of L2 network addresses between the PBBN routing instance and the PBN routing instance may achieve such efficiencies in a scalable manner. For example, the techniques may be used to identify only those hardware and software components controlled by the PBBN routing instance or the PBN routing instance to which L2 network addresses are to be shared, thereby potentially avoiding leaking all L2 network addresses to all components of the L2 switch.

In one embodiment, an L2 switch comprises a control unit executing a provider backbone bridged network (PBBN) routing instance and a separate provider bridge network (PBN) routing instance. The PBBN routing instance and the PBN routing instance provides a layer two (L2) bridging service between the PBN and the PBBN. The L2 switch further comprises a plurality of packet-forwarding engine (PFE) configured to forward L2 packets between interfaces of the PBN routing instance and the PBBN routing instance. The PFEs store L2 network address tabled, where each of the L2 network address tables specify L2 network addresses reachable by the interfaces. The PFEs of the L2 switch are configured to share L2 network addresses between the L2 network address tables of the PBN routing instance and the L2 network address tables of the PBBN routing instance.

In one embodiment, a method comprises executing a provider backbone bridged network (PBBN) routing instance and a separate provider bridge network (PBN) routing instance on a network device, wherein PBBN routing instance and the PBN routing instance provide a layer two (L2) bridging service between the PBN and the PBBN. The method further comprises receiving, on a first interface of the PBBN routing instance, a layer two (L2) packet from a first backbone virtual local area network (B-VLAN) of the PBBN, and identifying, with the network device, a source backbone L2 network address specified by an outer header of the L2 packet in association with the B-VLAN. The method further comprises updating L2 network address tables of the network device to associate the source backbone L2 network address and the B-VLAN with the first interface on which the L2 packet was received, wherein the updated L2 network address tables includes both an L2 network address table controlled by with the PBBN routing instance and an L2 network address table controlled by the PBN routing instance, and forwarding L2 packets with the network device between the PBBN and the PBN in accordance with the updated L2 network address tables.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
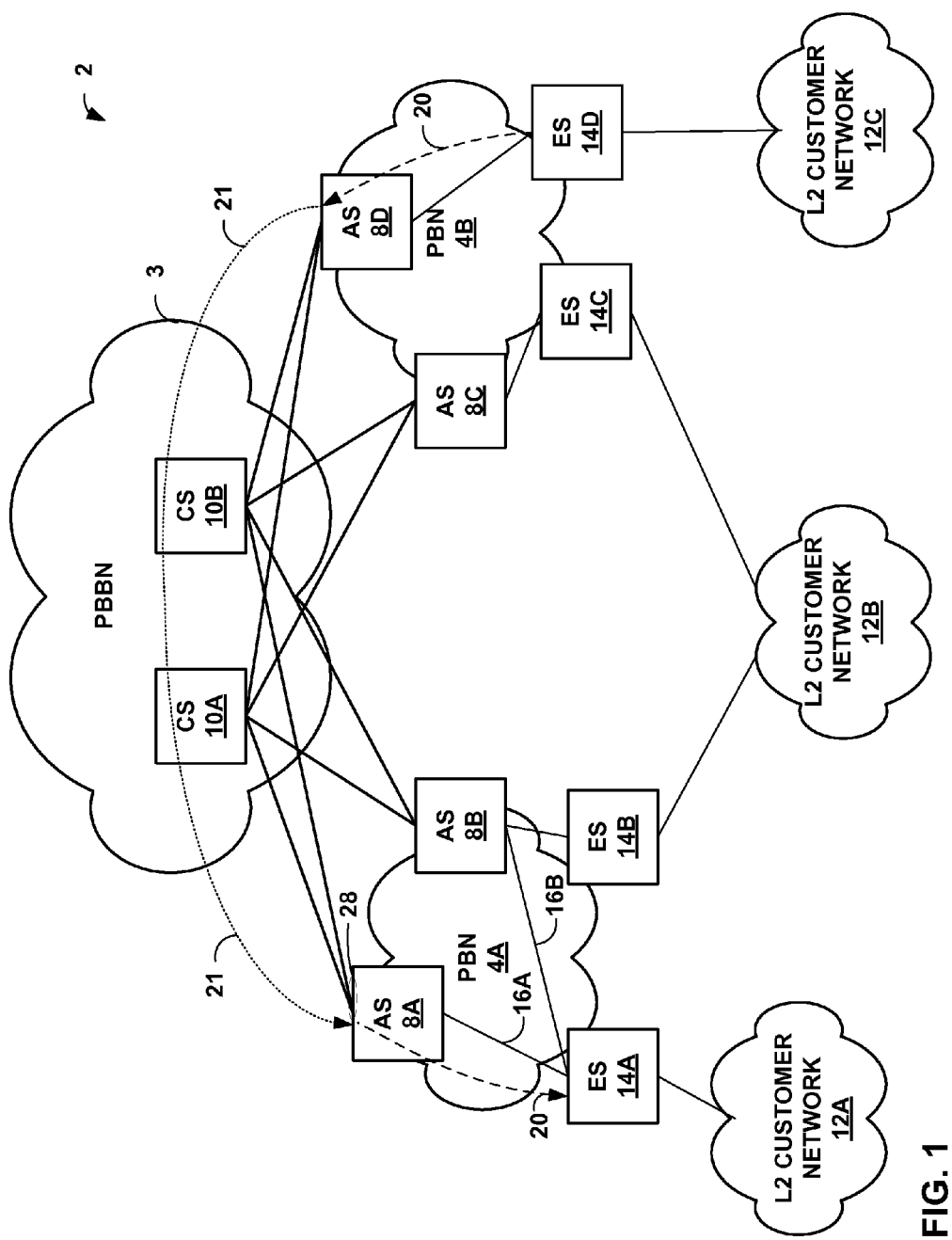
FIG. 1 is a block diagram illustrating an example network in which a Provider Backbone Bridged Network (PBBN) provides L2 connectivity between multiple provider bridge networks (PBN).

FIG. 1 is a block diagram illustrating an example network 2 in which a Provider Backbone Bridged Network (PBBN) 3 provides L2 connectivity between multiple provider bridge networks (PBN) 4A, 4B (collectively, "PBNs 4"). Each of PBNs 4 represents a component and infrastructure of a service provider that provide bridged local area network services to L2 customer networks. Each PBN 4 provides one or more service VLANs ("S-VLANS) to service and isolate L2 traffic from L2 customer networks 12. PBNs 4 may be L2 bridging networks provided by the same network service provider or by one or more different service providers.

In the example of FIG. 1, each of PBNs 4 includes one or more access switches 6 that connect the PBN to core switches within PBBN 2. In the example of FIG. 1, access switch (AS) 8A an AS 8B provide L2 connectivity to core switches (CS) 10A, 10B. Similarly, AS 8C and AS 8D provide L2 connectivity to CS 10A and CS 10B. PBBN 3 is composed of a set of Backbone Edge Bridges (BEBs) provided by backbone-facing components of access switches 8. That is, each of AS 8A-AS 8D provides a BEB for bridging to the backbone domain of PBBN 3. Each BEB provides interfaces that encapsulate (or verifies the encapsulation of) customer frames, thus allowing customer MAC (C-MAC) addresses and VLANs to be independent of the backbone MAC (B-MAC) addresses and VLANs administered by the PBBN operator.

In this way, each of PBNs 4 provide L2 bridging connectivity for one or more of L2 customer networks 12A, 12B and 12C. In this example, L2 customer network 12A is coupled to PBN 4A by an edge switch (ES) 14A. L2 customer network 12B is coupled to PBNs 4A, 4B by ES 14B and ES 14C. L2 customer network 12C is coupled to PBN 4B by ES 14D.

L2 switches within the backbone domain provided by PBBN 3, such as core switches (CS 10A and CS 10B), typically learn and maintain L2 state information (e.g., media access control (MAC) addresses and respective physical ports by which the MAC addresses are reachable) for devices within the PBBN. Conversely, edge switches (e.g., ES 14A through ES 14D) may learn and maintain L2 state information including MAC addresses for devices within a customer domain including the devices within PBNs 4 and L2 customer networks 12. Access switches (e.g., AS 8A through AS 8D) may learn and maintain L2 state information including MAC addresses and corresponding ports for devices in both the customer domain and the backbone domain to provide bridging services as BEBs. In this way, network 2 provides a large-scale, carrier-class L2 network based on a hierarchy of L2 bridges. In one example, network 2 is a metropolitan access network that covers a metropolitan area and is based on Ethernet communications. Network 2 may be used to connect individual subscribers, businesses, or even large-scale data centers to a larger service network or the Internet. In one example, network 2 conforms to the standards set forth in IEEE 802.1 ah. Moreover, although referred to herein as L2 switches, edge switches 14, access switches 8, and core switches may be routers or other devices that incorporate L2 switching functionality.

In operation, L2 network communications (e.g., Ethernet frames) flow between PBNs 4 via PBBN 3. Customer traffic originating from L2 customer networks 12 typically arrive at edge switches 14 in association with a customer VLAN. That is, L2 communications (e.g., Ethernet frames) from L2 customer networks 12 typically carry customer VLAN tags and customer VLAN identifiers in addition to source and destination media access control (MAC) addresses for devices within the L2 customer networks. Edge switches 14 receive the L2 communications from L2 customer networks 12 and associate the communications with a service VLAN (S-VLAN) defined within the PBN. Each S-VLAN has a corresponding identifier (S-VID) and edge switches 14 tag each L2 frame with an S-VLAN tag associated with the corresponding PBN 4 with which the L2 frame was received.

Traffic flowing from one PBN 4 through PBBN 3 to a different PBN 4 is carried by the service VLAN and is further encapsulated within a backbone VLAN as part of the bridging service provided by the BEBs. That is, L2 frames flowing through PBBN 3 further carry backbone VLAN tags and backbone VLAN identifiers in addition to source and destination MAC addresses for core switches 10 within PBBN 3. As operational BEBs, AS 8A through AS 8D provide a mapping between the VLAN and MAC address space of PBNs 4 and PBBN 3.

For example, L2 traffic may flow from ES 14D to ES 14A over a first SVLAN 20 bridged to flow through backbone VLAN (B-VLAN) 21. L2 traffic of SVLAN 20 flows through PBBN 3 from AS 8D to AS 8A via B-VLAN 21 in which the L2 traffic is further encapsulated and decapsulated via AS 8A and 8AD operating as BEBs. In steady state operation, CS 10A, CS 10B, AS 8A and AS 8D each maintain MAC state information for B-VLAN 21, including state information indicating which physical interface the MAC address for AS 8A is reachable.

In example embodiments, one or more of AS 8A-AS 8D provide routing and forwarding functionality to bridge between the domains of the PBN and the PBBN by making use of logically separated, self-contained routing instances. As one example, as an operational BEB, AS 8A includes implements logically separated routing instances for PBN 4A and PBBN 3, each of the routing instances having separate L2 network address and VLAN information. The logically-isolated routing instances, including the hardware components, software components, and state information controlled thereby within the switch, within AS 8A-AS 8D are collectively referred to as separate domain, e.g., a PBN domain and a PBBN or bridge domain. Learning of L2 state information within the hardware and software components is generally logically isolated to the domain in which components functions. That is, the hardware and software components of each of the routing instances learns L2 network addresses only for the routing instances with which they are associated. However, as described herein, the L2 switch, such as AS 8A, "leaks" L2 network addresses between the otherwise logically isolated components assigned to the routing instances of the PBN and PBBN within the switch. Moreover, the L2 network address information may be leaked between the components of the routing instances in a constrained manner. For example, the techniques described herein may identify a reduced set of packet-forwarding engine within each routing instance to which the leaked L2 network addresses are to be installed and stored in respective L2 network address tables. The constrained leaking of L2 network addresses between the PBBN domain and the PBN domain of AS 8A, for example, may achieve such efficiencies in a scalable manner. For example, the techniques may be used to identify only those hardware and software components operating of AS 8A within the PBBN domain or the PBN domain to which L2 network addresses are to be shared, thereby potentially avoids leaking all L2 network addresses to all components of either domain.

Moreover, the techniques may allow AS 8A to provide bridging services between two L2 domains while performing all L2 network address lookups at single point within the forwarding process, e.g., at the ingress interface of the network device. For example, AS 8A may receive an L2 data frame in the PBBN domain via VLAN 21 over ingress interface 28. AS 8A initially performs a lookup on a destination backbone MAC address of an outer header of the L2 data frame to determine which egress interfaces to forward copies of the L2 data frame, where the egress interfaces may be internal, logical interfaces of the PBBN domain that bridge to logical interfaces of the PBN domain within AS 8A. As L2 network addresses may be selectively leaked between the domains within AS 8A in a constrained manner, AS 8A may efficiently perform a second lookup at this time on a customer destination MAC address within an inner header of the encapsulated L2 data frame to further determine the egress interfaces of the PBN domain to which to forward copies of the L2 data frame. In this manner, constrained leaking of L2 network address information between the logically separate routing instances within the L2 switch may allow efficient lookup within AS 8A for both an outer bridge-domain L2 network address and an inner PBN-domain L2 network address using a common L2 network address table.

Figure 2:
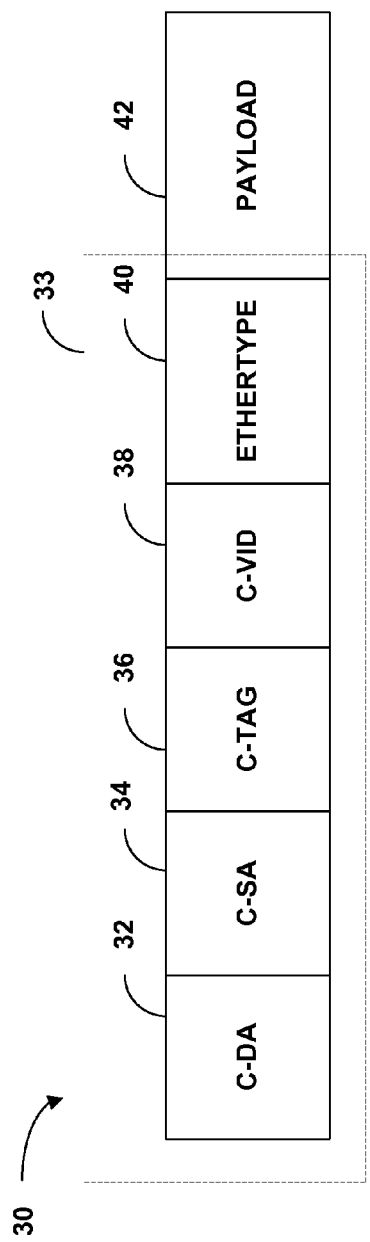
FIG. 2 is a block diagram illustrating an example format of L2 data frames received from L2 networks.

FIG. 2 is a block diagram illustrating an example format of L2 data frames received from L2 customer networks 12. In this example, Ethernet frame 30 includes an L2 header 33 and a payload 42. L2 header includes a customer device destination MAC address 32, a customer device source MAC address 34, a customer VLAN (CVLAN) tag 36, a customer VLAN identifier 38 and header information 40 indicating the L2 frame is of type Ethernet. L2 header 33 of Ethernet frame 30 may include additional fields not shown for purposes of simplicity.

Figure 3:
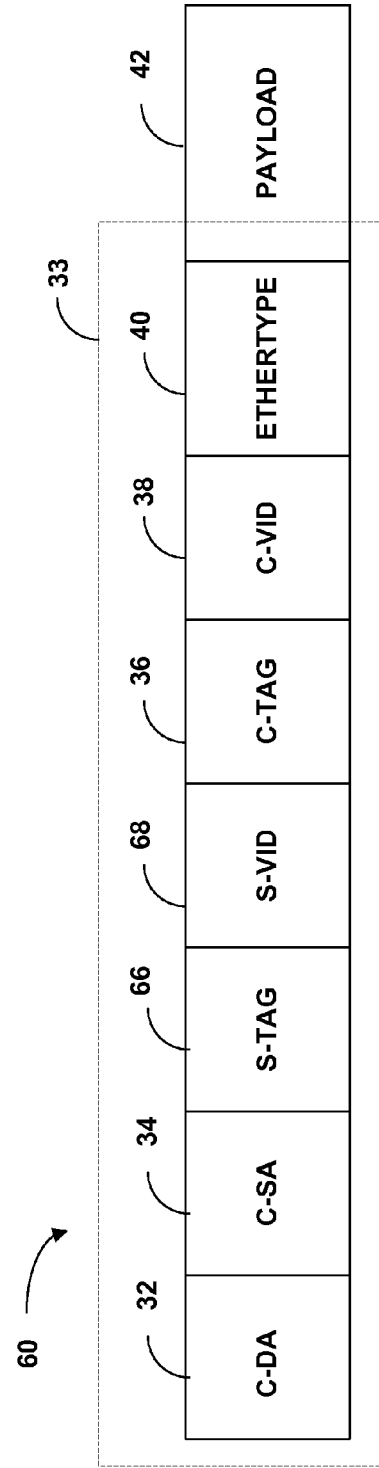
FIG. 3 is a block diagram illustrating an example format of L2 data frames traversing PBNs.

FIG. 3 is a block diagram illustrating an example format of L2 data frames traversing PBNs 4, such as L2 traffic forwarded from ES 14A to AS 8A. In this example, ES 14A has generated Ethernet frame 60 by associating original Ethernet frame 30 with a service VLAN (SVLAN) and reforming L2 header 33 to include a service VLAN tag 66 and a service VLAN identifier 68.

Figure 4:
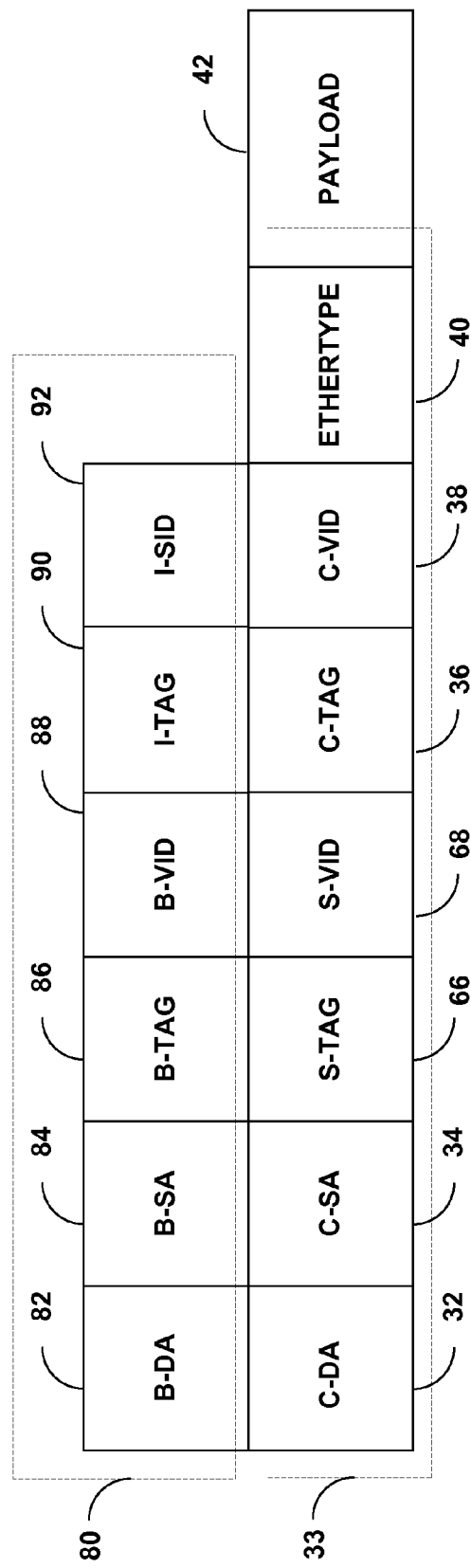
FIG. 4 is a block diagram illustrating an example format of L2 data frames traversing a PBBN.

FIG. 4 is a block diagram illustrating an example format of L2 data frames traversing PBBN 3, such as L2 traffic bridged from AS 8D to AS 8A to the PBBN for forwarding over B-VLANs via CS 10A or CS 10B. In this example, operating as a BEB, AS 14A has generated an Ethernet frame by associating Ethernet frame 60 with and a backbone VLAN (B-VLAN) and then encapsulating Ethernet frame 60 with an additional L2 header 80. In this example, L2 header 80 includes a bridge device destination MAC address 82, a bridge device source MAC address 84, a backbone VLAN (B-VLAN) tag 86, a backbone VLAN identifier 88 and I-TAG 90 and I-SID 92 that uniquely identify the customer associated with the traffic as the traffic is carried throughout PBBN 3 by one or more backbone VLANs. In this way, the BEB, such as AS 8A, provides a mapping to bridge VLAN and MAC address information between a PBN and the PBBN.

Figure 5:
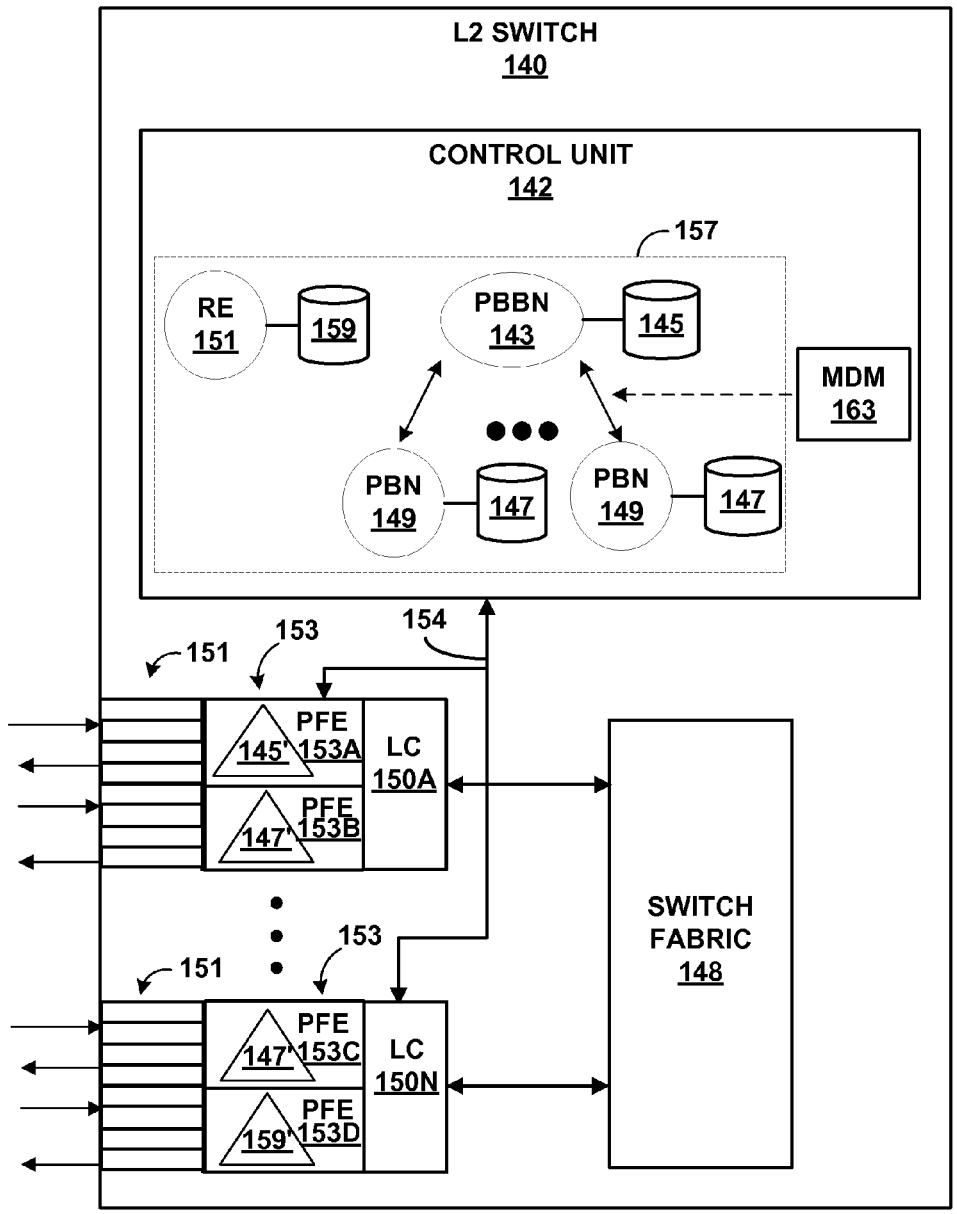
FIG. 5 is a block diagram illustrating an example L2 switch.

FIG. 5 is a block diagram illustrating an example L2 switch 140, such as access switch 8A of PBBN 3. In this example, L2 switch 140 includes control unit 142 that provides control plane functionality for the L2 switch. L2 switch 140 also includes switch fabric 148 interconnecting a set of line cards ("LCs") 150A-150N, each of which includes a one or more of packet-forwarding engines ("PFEs") 153 that send and receive traffic by a set of interface cards 151 ("IFCs 151") that typically have one or more physical network interfaces (ports). LCs 150, components thereof, and switch fabric 148 collectively provide a data plane for forwarding transient network traffic, such as the L2 frames and VLAN traffic described herein. Although not shown in FIG. 5, PFEs 153 may each comprise a central processing unit (CPU), memory and one or more programmable packet-forwarding application-specific integrated circuits (ASICs). Switch fabric 148 provides a high-speed interconnect for forwarding incoming data packets between PFEs 153 for transmission over a network.

Control unit 142 provides control plane functions for L2 switch 140. For example, control unit 142 provides an environment for storing L2 network topology information, e.g., spanning tree information, executing Connectivity Fault Management (CFM) protocols that provide fault isolation and detection over large Layer 2 networks which may span several service provider networks, and providing a management interface to allow user access and configuration of L2 switch 140. The operating environment of control unit 142 may be implemented solely in software, or hardware, or may be implemented as a combination of software, hardware or firmware. For example, control unit 142 may include one or more processors which execute software instructions. In that case, control unit 142 may include various software modules or daemons executing on an operating system, and may include a non-transitory computer-readable storage medium, such as computer memory or hard disk, for storing executable instructions.

The forwarding components (e.g., PFEs 153 and interface cards 151) of L2 switch 140 may be logically partitioned into multiple groups, and each group is assigned to and controlled by a different one of routing instances 157. In the example of FIG. 5, control unit 142 maintains a routing instance 143 for the PBBN domain, a routing instance 149 for each PBN serviced by the L2 switch 140 and, in this example, a routing instance 151 that does not participate in either the PBBN or a PBN but may service a different routing domain. Each PFE 153 may be individually assigned to a different one of routing instances 157, and each routing instance exclusively owns the interface cards of the PFEs assigned to the routing instance. Each of routing instances 157 of control unit 142 controls L2 forwarding functions for the domain that it services. For example, the routing instance PBBN 143 exclusively owns PFEs and corresponding interface cards having network interfaces for servicing the PBBN, while routing instances 149 exclusively own PFEs and corresponding interface cards for servicing the corresponding PBNs.

Each of routing instances 157 maintains a corresponding forwarding information base (FIB) that stores identifiers for a set of PFEs 153 and a set of interfaces allocated to the domain. The FIB for each routing instance 157 also stores topology data representing a logical topology of the L2 network, e.g., a spanning tree, from the perspective of the interfaces, and MAC tables and VLAN information, including VLAN tags and identifiers such as the S-VLANS and B-VLANS, for the interfaces of the routing domain. For example, PBBN 143 routing instance maintains a FIB 145 for the PBBN domain, PBN 149 routing instances maintains FIBs 147 for the PBN domains, and routing instance 151 not participating in either the PBN or the PBBN maintains FIB 153 for the domain it services. Each of the routing instances 157 may execute separate protocols and separately store the data for its associated FIB 147.

In this example, control unit 142 is connected to each of LCs 150 by a dedicated internal communication link 154. For example, dedicated link 154 may comprise a 200 Mbps Ethernet connection. In one embodiment, control unit 142 communicates data representative of a software copy 145', 147' and 153' of FIBs 145, 147 and 153 into PFEs 153 to program the PFEs and thereby control forwarding of traffic by the corresponding components within the data plane that are associated with each of routing instances 157. This allows the software FIB stored in memory (e.g., on-chip RAM) of in each of PFEs 153 to be updated without degrading packet-forwarding performance of L2 switch 140. In some instances, control unit 142 may derive separate and different software FIBs for each respective PFEs 153. In addition, one or more of PFEs 153 may include packet-forwarding ASICs (not shown) that PFEs 153 program with a hardware-copy of FIB based on the software FIBs (i.e., hardware versions of the software FIBs) copied to each respective PFE 30. In the example of FIG. 1, control unit 142 has programmed a first PFE 153 of FPC 150A with a FIB 145' for PBBN routing instance 143, a second PFE of FPC 150A with FIB 147' for a PBN routing instance 149, a first PFE 153 of FPC 150N with FIB 147' for a second PBN routing instance 149, and a second PFE 153 of FPC 150N with FIB 153' for routing instance 151. In other, more complex embodiment, L2 switch may have many more LCs 150 (e.g., 48 or 64 FPCs), each of which may have four PFEs 150 that each couple to up to sixteen interface cards 151.

PFEs 153 learn of L2 network addresses as L2 communications flow through the network interfaces assigned to their routing domains. In general, the hardware and software components assigned to each of routing instances 157 learn L2 network addresses only for the routing instances with which they are associated. For example, L2 network addresses learned by forwarding hardware of PFE 153A with respect to the interfaces assigned to the PBBN domain provided by PBBN routing instance 143 are used to update MAC tables of corresponding FIB 145' programmed within the forwarding ASICs. Similarly, L2 network addresses learned by forwarding hardware PFEs 153 with respect to interfaces assigned to a PBN domain provided by one of PBNs 149 are used to update MAC tables within the corresponding one of FIBs 147' programmed within the forwarding ASICs. Learning of L2 network addresses may occur by direct communication of data between the PFEs of the domain, where the data specifies the learned MAC address and VLAN tag and the ingress interface on which the MAC address was received. Alternatively, learning may occur by way of communication of the data to control unit for reprogramming FIBs 145', 147' and the MAC tables therein. For example, upon learning reachability information for new MAC addresses, control software within LCs 150 relays the learned MAC addresses for each domain to control unit 142 via link 154 for updating FIBs 145, 147 or 151.

In any event, PFEs 153 utilize the updated MAC tables within the FIBs to determine a set of one or more egress interfaces to forward the L2 traffic. For example, a PFE 153 may broadcast an L2 frame to all interfaces associated with its corresponding one of routing instance 157 in the event the destination MAC address has not been previously learned by L2 switch 140 and, therefore, the L2 switch cannot identify the particular egress interface through which the destination MAC address is reachable. However, once a destination MAC address is learned as reachable for a particular VLAN (i.e., seen as a source MAC address for the VLAN on a particular ingress interface), a PFE 153 may send subsequent L2 traffic destined for that MAC address out the particular interface through which the MAC address is reachable.

Upon receiving the learned MAC addresses, control unit 142 updates the MAC tables within the appropriate FIB 145, 147 or 151. For example, upon receiving an update message from FPC 150A with one or more MAC addresses learned respect to FIB 145', PBBN routing instance 143 installs the MAC addresses within FIB 145. Each MAC table may be partitioned by VLAN identifier and, for each VLAN, includes entries that associate MAC addresses for that VLAN with network interfaces through which the MAC addresses are reachable.

As illustrated in the example of FIG. 5, leaking of L2 network addresses between the PBN routing instance 143 and PBN routing instances 149 occurs in the control plane provided by control unit 142. In this example, a MAC address distribution module (MDM 163) executing within control unit 142 "leaks" L2 network addresses between the otherwise logically isolated routing instances of the PBN and PBBN within L2 switch 140. For example, MDM 163 may selectively leak MAC addresses and VLAN information from PBBN routing instance 143 to each of PBN routing instances 149. Further, MDM 163 may selectively leak MAC addresses and VLAN information from a PBN routing instance 149 to PBBN routing instance 143. MDM 163 may be viewed as applying constrained leaking by, for example, preventing MAC addresses and VLAN information from being leaked between PBN routing instances 149. Moreover, MDM 163 may prevent MAC addresses from being leaked to routing instances that do not participate in the PBBN or PBN domains, such as routing instance 151. Control unit 140 propagates the updated MAC address tables into the appropriate PFEs 153 based on the assignment of interfaces of those PFEs to the different domains.

The techniques may allow L2 switch 140 to provide bridging services between two L2 domains (e.g., a PBBN and a PBN) while performing L2 network address lookups at single point within the forwarding process, e.g., at the ingress interface of the network device. For example, L2 switch 140 may receive an L2 data frame in the PBBN domain via over ingress interface of PFE 153A FPC 150A. The PFE 153A initially performs a lookup in FIB 145' using the outer destination MAC address (B-DA) of the L2 data frame to determine which egress interfaces of the PBBN routing instance to forward copies of the L2 data frame, where the egress interfaces may be internal, logical interfaces of the PBBN domain that bridge to logical interfaces of the PBN domain to the PBN domain. As L2 network addresses of the PBN domain may have been leaked between the domains and installed in FIB 145', PFE 153 may at this time efficiently perform a second lookup using the inner MAC address (C-DA) to further determine the egress interfaces of the PBN domain to which to forward copies of the L2 data frame after decapsulation and removal of the outer L2 header 80. In this manner, constrained leaking of L2 network address information between the PBBN and PBN domains may allow a single lookup within L2 switch 140 for both an outer bridge-domain L2 network address and an inner PBN-domain L2 network address using a common L2 network address table of FIB 145' in the data plane. Similarly, ingress L2 traffic received by a PFE 153 of a PBN routing instance 147 may be bridged to the PBBN domain via encapsulation using lookups on the C-DA and the B-DA of in a common MAC table for the appropriate FIB 147'.

The constrained leaking of L2 network addresses between PBBN routing instance 143 and the PBN routing instances 149 may achieve these efficiencies in a scalable manner. For example, the techniques described herein may identify a reduced set of PFE's 153 to which the L2 network addresses are to be leaked and installed and stored in respective MAC address tables. For example, when installing updates to LCs 150, MDM 163 may first identify a list of interfaces participating in the PBBN or PBN routing instances 143, 149. Based on the determined list, MDM 163 derives a set of PFEs 153 into which the learned MACs are to be installed.

FIGS. 6A-6E are block diagrams showing a logical representation of a PBBN routing instance 180 and three different PBN routing instances 182, 184 and 186 within L2 switch 175, which may be any of the L2 switches described herein. In some cases, PBBN routing instance 180 may be referred to as a B-component routing instance and each of the three different PBN routing instances 182, 184 and 186 may be referred to as I-component customer routing instances.

Figure 6A:
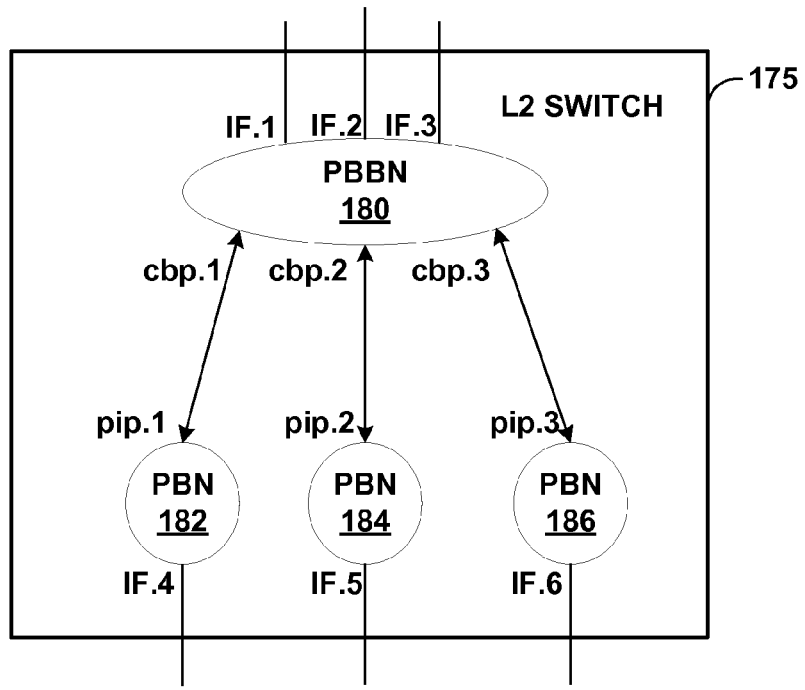
FIGS. 6A-6E are block diagrams showing a logical representation of a PBBN routing instance and three different PBN routing instances within an L2 switch.

As shown in the example of FIG. 6A, each PBN routing instances 182, 184 and 186 is associated with a respective provider-instance port (pip) interface, and PBBN routing instance 180 is associated with respective a customer backbone port (cbp) interface, where the cbp interface can service multiple PBN routing instances. Pip interfaces and the cbp interface are treated as interfaces by the L2 switch that are addressable within forwarding information of L2 switch 175, but are internal interfaces that are logically connected so as to provide connectivity for forwarding packets between forwarding components assigned to the isolated routing instances. Although only a single PBBN routing instance 180 is shown, some complex devices may support multiple PBBNs on a single device (e.g., up to sixteen PBBNs) and numerous PBNs. In this way, an L2 device can provide carrier-class bridging services for multiple PBBN networks.

As discussed in the example above, a MAC address distribution module (e.g., MDM 163 of FIG. 5) executing within the L2 switch selectively leaks MAC addresses and VLAN information between PBN routing instances and a PBBN instance. MDM ensures that SA-MACs learned on one logical interface of a routing instance are presented to the MAC tables of that routing instance as DA-MACs that are reachable via the VLAN and logical interfaces through which the SA-MACs were learned. Moreover, when determining the set of interfaces associated with the routing domain with respect to MAC learning, the MDM expands the set of interfaces to selectively leak the MAC addresses and VLAN information to the MAC tables of the forwarding elements of the otherwise logically separate routing domains. For example, with respect to a PBN routing instance n (e.g., any of PBNs 182, 184, 186), the MDM may expand the interface list that controls MAC learning for that PBN to include all interfaces defined in that PBN routing instance (including outward facing interfaces and the pip interface) and all interfaces defined in the PBBN routing instance to which the PBN routing instance is bridged (including all outward facing interfaces of the PBBN and cbp interface). This list is used to identify an overall set of PFEs 153 for which the MAC tables are updated for MAC learning, and may be represented as:

Interface list=ΣIFLs for PBN$_n$+ΣIFLs for PBBN.

With respect to a PBBN routing instance, the MDM may identify an interface list that includes all interfaces defined in the PBBN routing instance (including all outward facing interfaces and the cbp interface) and the sum of interfaces for all N PBN routing instances to which the PBBN is bridged (including all outward facing interfaces and all pip interfaces). Again, this list is used to identify an overall set of PFEs 153 for which the MAC tables are updated for MAC learning, and may be represented as:

$$\textit{Interfacelist} = \sum \textit{IFLs for PBBN} + \sum_{1}^{N} \textit{IFLs for PBN}(N).$$

Figure 6B:
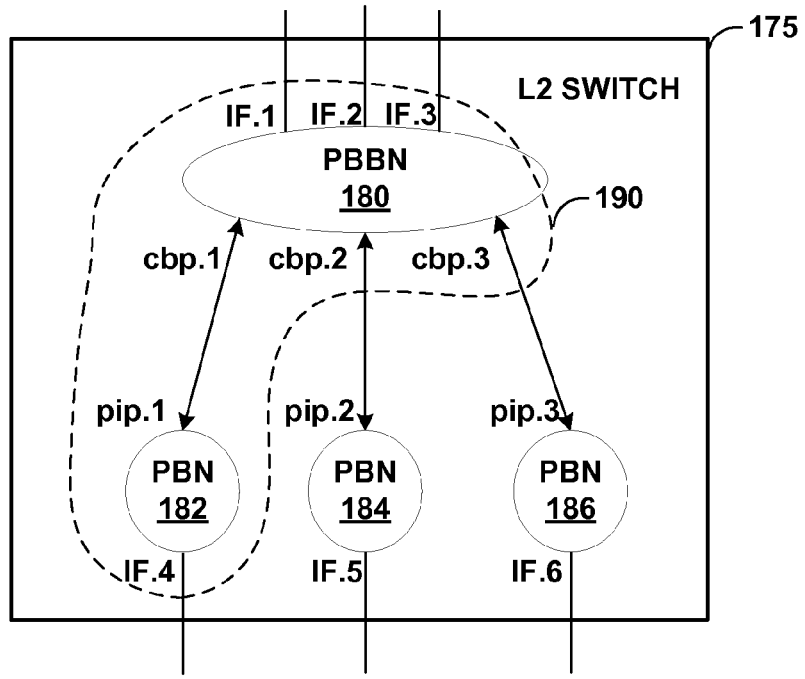
Figure 6C:
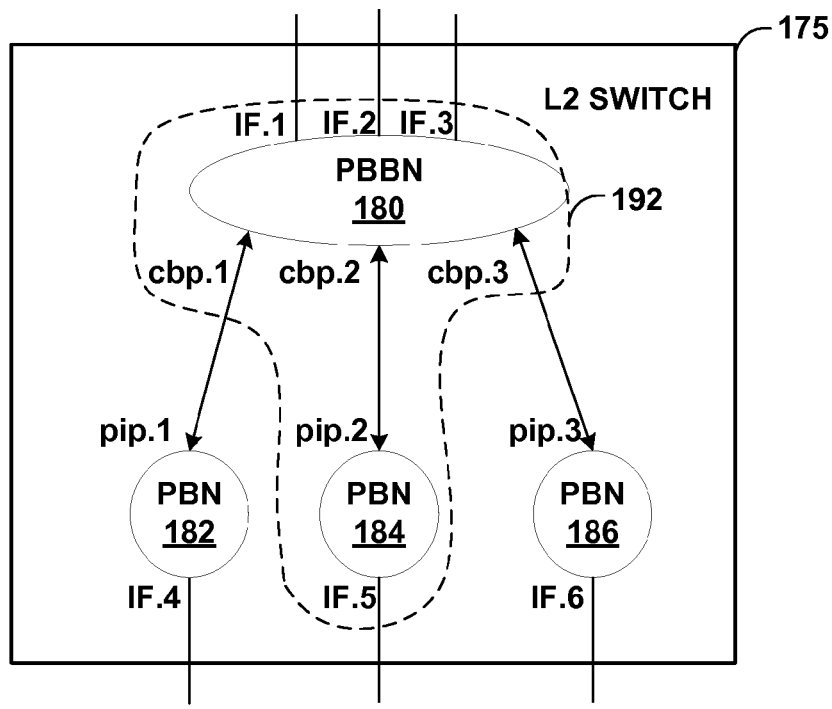
Figure 6D:
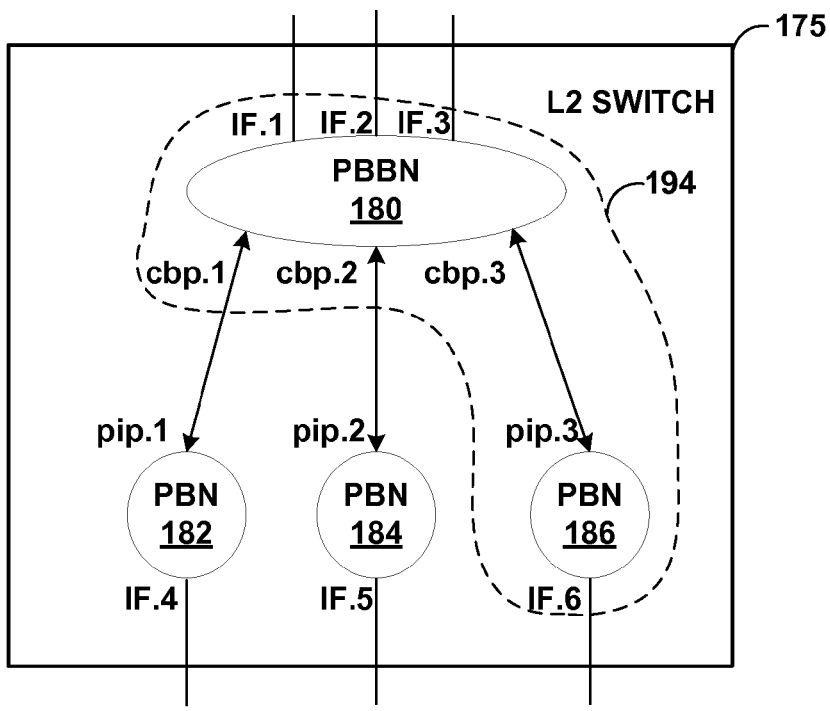
Figure 6E:
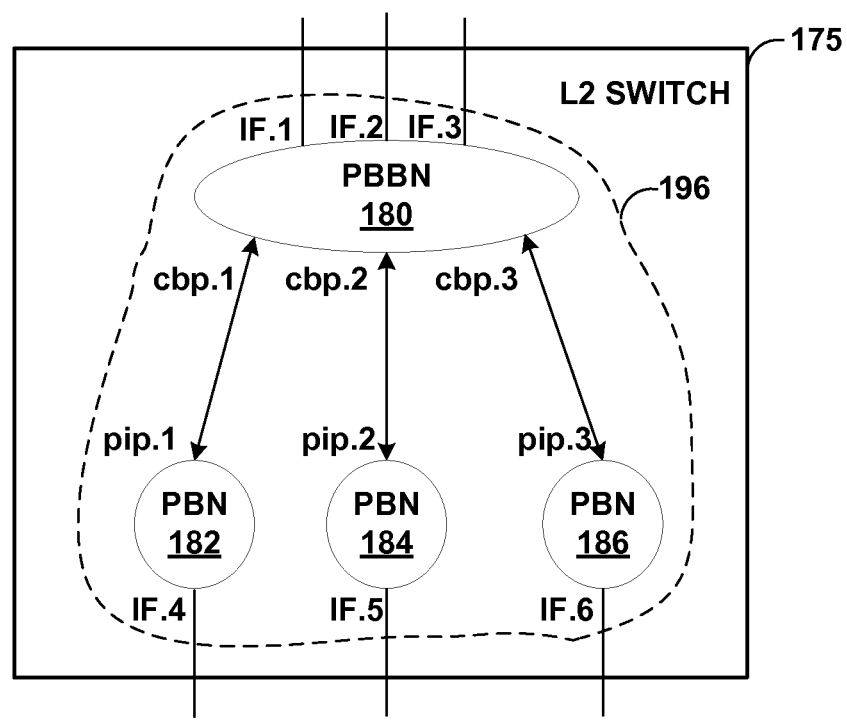

In other words, as shown in FIG. 6B, MAC addresses and VLAN information learned by PBN routing instance 182 are presented for storage in MAC tables of PFEs 153 associated with a set of interfaces 190 that is expanded to include not only the interfaces of PBN routing instance 182 but also the cbp interface of PBBN routing instance 180 and interfaces IF.1-IF.3. Similarly, as shown in FIGS. 6C, 6D, MAC addresses and VLAN information learned by PBNs 184, 186 are presented for storage within MAC tables of PFEs 153 associated with the set of logical interfaces 192, 194, respectively. Moreover, as shown in FIG. 6E, MAC addresses and VLAN information learned by PBBN 180 are presented for storage within MAC tables of PFEs 153 associated with the set of interfaces 196 which is expanded to include the internal pip interfaces of all of PBN routing instances 182, 184, 186 and outward-facing interfaces IF.4-IF.6.

For example, PBN routing instance 182 may receive an inbound L2 data frame on interface IF.4 in the format shown in FIG. 3. In the case L2 address information for the L2 data frame has not been previously learned by the L2 switch, the customer source MAC (C-SA 34) and the VLAN (S-VID 68) is identified from which the L2 data frame was received and installs the information in MAC tables associated with the set of interfaces 190. As discussed above, this update process according to the expanded interface list may occur in the control plane or in the data plane. In either case, the learned PBN L2 address information is leaked from PBN 182 to components of the L2 switch associated with PBBN routing instance 180. As another example, PBBN routing instance 180 may receive an inbound L2 data frame on interface IF.1 in the format shown in FIG. 4. In the case L2 address information for the L2 data frame has not been previously learned by the L2 switch, the backbone source MAC (B-SA 84), the backbone VLAN (B-VID 88) of header 80, the customer source MAC (C-SA 34), the VLAN (S-VID 68) of header 33 and the interface from which the L2 data frame was received are identified, and the data is installed in MAC tables of PFEs 153 associated with the expanded set of interfaces 196. In this way the learned PBBN L2 address information is leaked to components of the L2 switch associated with PBN routing instances 182-186.

In some examples, the L2 switch may program components within the data plane to perform dynamic, hardware-based MAC learning. For example, referring to FIG. 2 by way of an example, MDM 163 may communicate with LCs 150 to install the expanded interface lists described above in the PFEs 153 that service one or more of the interfaces. When L2 data frames are received by one of PFEs 153, the PFE utilizes the programmed interface list to determine the interfaces to which any learned L2 address data is to be forwarded in hardware so as to dynamically update the MAC tables of one or more of FIBs 145, 147. By utilizing the expanded interface lists, learned L2 address information need not be leaked to all PFEs of the L2 switch but instead can be installed within a reduced set of the PFEs.

The techniques may allow L2 switch 175 to provide bridging services between the PBBN and the PBNs while performing all L2 network address lookups at single point within the forwarding process, e.g., at the ingress interface of the L2 switch. For example, a PFE having interface IF.1 associated with PBBN routing instance 180 may receive an inbound L2 data frame in the PBBN domain. Due to the expanded MAC learning with respect to the PBN domain, the PFE may perform lookups on the B-DA 82 and B-VID 88 of outer header 80 as well as C-DA 32 and S-VID 68 of inner header 33 to determine which egress interfaces to forward the L2 data frame (e.g., egress interface cbp.1 of PBBN routing instance 180 and egress interface IF.4 of PBN routing instance 182. When forwarded through the determined interfaces, the interfaces perform the decapsulation and bridging services for the L2 data frame. In this way, the ingress PFE may efficiently identify the internal forwarding path including the ultimate egress PFE and interface for the L2 data frame even though the egress interface may in fact reside within a different routing instance.

Various embodiments of the invention have been described. These and other embodiments are within the scope of the following claims.

The invention claimed is:

1. A method comprising:
   executing a provider backbone bridged network (PBBN) routing instance and a separate provider bridge network (PBN) routing instance on a network device, wherein PBBN routing instance and the PBN routing instance provide a layer two (L2) bridging service between a PBN and a PBBN using an L2 network address table controlled by the PBBN routing instance and a separate L2 network address table controlled by the PBN routing instance;
   receiving, on a first interface of the PBBN routing instance, a layer two (L2) packet from a first backbone virtual local area network (B-VLAN) of the PBBN;
   identifying, with the network device, a backbone source L2 network address specified by an outer header of the L2 packet in association with the B-VLAN;
   updating both the L2 network address table controlled by the PBBN routing instance and the L2 network address table controlled by the PBN routing instance to associate the backbone source L2 network address and the B-VLAN with the first interface on which the L2 packet was received; and
   forwarding L2 packets with the network device between the PBBN and the PBN in accordance with the updated L2 network address tables.

2. The method of claim 1, further comprising:
   identifying, with the network device, a source customer L2 network address specified by an inner header of the L2 packet; and
   updating both the L2 network address table controlled by the PBBN routing instance and the L2 network address table controlled by the PBN routing instance to associate the source customer L2 network address with the first interface on which the L2 packet was received.

3. The method of claim 1,
   wherein the PBBN routing instance defines a first set of interfaces and the PBN routing instance defines a second set of interfaces, and
   wherein updating both the L2 network address table controlled by the PBBN routing instance and the L2 network address table controlled by the PBN routing instance comprises:
      determining an expanded set of interfaces that includes one or more interfaces from both the first set of interfaces defined by the PBBN routing instance and the second set of interfaces defined by the PBN routing instance; and
      updating only L2 network address tables of packet forwarding engines that are associated with the expanded set of interfaces.

4. The method of claim 3, further comprising:
   executing at least one additional routing instance on the network device that does not participate in providing the bridging service between the PBBN and the PBN, wherein the additional routing instance defines an additional set of interfaces, and
   wherein determining the expanded set of interfaces includes determining the expanded set to include only interfaces from the first set of interfaces defined by the PBBN routing instance and the second set of interfaces defined by the PBN routing instance without including any of the interfaces defined by the additional routing instance.

5. The method of claim 3, further comprising:
   programming a set of hardware-based packet forwarding engines with the expanded set of interfaces; and
   performing the updating of the L2 network address tables of packet forwarding engines in hardware.

6. The method of claim 1, wherein updating both the L2 network address table controlled by the PBBN routing instance and the L2 network address table controlled by the PBN routing instance comprises updating forwarding information within a control plane of the network device.

7. The method of claim 1, further comprising:
   receiving, on an interface of the PBN routing instance, an L2 packet from a Virtual Local Area Network (VLAN) of the PBN;
   identifying, with the network device, a source customer L2 network address specified by the L2 packet received from the VLAN of the PBN; and
   updating both the L2 network address table controlled by with the PBBN routing instance and the L2 network address table controlled by the PBN routing instance to associate the source customer L2 network address with the interface of the PBN routing instance.

8. The method of claim 1, wherein the L2 packet comprises an Ethernet frame.

9. The method of claim 1, wherein the network device comprises a router operating as an L2 network switch.

10. A layer two (L2) switch comprising:
    a control unit executing a provider backbone bridged network (PBBN) routing instance and a separate provider bridge network (PBN) routing instance, wherein PBBN routing instance and the PBN routing instance provide a layer two (L2) bridging service between a PBN and a PBBN using an L2 network address table controlled by the PBBN routing instance and a separate L2 network address table controlled by the PBN routing instance;
    a packet-forwarding engine (PFE) having an interface associated with the PBBN routing instance to receive an L2 packet from the PBBN, wherein the L2 packet is encapsulated with a virtual local area network (VLAN) tag of a first backbone VLAN of the PBBN, and wherein the PFE is configured to bridge the L2 packet from the first backbone VLAN to the PBN,
    wherein the PFE includes a packet-forwarding integrated circuit (IC) programmed to identify a backbone source L2 network address specified by an outer header of the L2 packet and update both the L2 network address table controlled by the PBBN routing instance and the L2 network address table controlled by the PBN routing instance to associate the backbone source L2 network address with the interface on which the L2 packet was received.

11. The L2 switch of claim 10, wherein the packet-forwarding IC is programmed to identify a source customer L2 network address specified by an inner header of the L2 packet and update both the L2 network address table controlled by with the PBBN routing instance and the L2 network address table controlled by the PBN routing instance to associate the source customer L2 network address with the interface on which the L2 packet was received.

12. The L2 switch of claim 10,
    wherein the PFE comprises a first one of a plurality of PFEs interconnected by a switch fabric, and
    wherein the PBBN routing instance defines a first set of interfaces and the PBN routing instance defines a second set of interfaces,
    wherein the control unit assigns each of the first set of interfaces defined by the PBN routing instance and the second set of interfaces defined by PBBN routing instance to one the PFEs,
    wherein the PFEs store respective L2 network address tables to specify L2 network addresses reachable by the first set of interfaces and the second set of interfaces, and
    wherein the first one of the PFEs updates the L2 network address tables stored by the PFEs by communicating data identifying the backbone source L2 network address and the interface on which the L2 packet was received to one or more of other PFEs.

13. The L2 switch of claim 12,
    wherein the packet-forwarding IC is programmed to store an expanded set of expanded set of interfaces that includes one or more interfaces from both the first set of interfaces defined by the PBBN routing instance and the second set of interfaces defined by the PBN routing instance, and
    wherein the packet-forwarding IC is programmed to update the L2 network address tables of the PFEs that are associated with the expanded set of interfaces with the L2 network address identified to associate the backbone source L2 network address with the interface on which the L2 packet was received.

14. The L2 switch of claim 12, further comprising:
    at least one additional routing instance executing on the control unit that does not participate in providing the bridging service between the PBBN and the PBN, wherein the additional routing instance defines an additional set of interfaces, wherein the control unit determines the expanded set of interfaces to include only interfaces from the first set of interfaces defined by the PBBN routing instance and the second set of interfaces defined by the PBN routing instance without including any of the interfaces defined by the additional routing instance.

15. The L2 switch of claim 10,
wherein the PFE updates the L2 network address tables of the L2 switch by communicating data identifying the backbone source L2 network address and the first interface on which the L2 packet was received to the control unit, and
wherein, in response, the control unit updates forwarding information associated with the PBBN routing instance and forwarding information associated with the PBN routing instance.

16. The L2 switch of claim 10, wherein the L2 packet comprises an Ethernet frame.

17. The L2 switch of claim 10, wherein the network device comprises a router operating as an L2 network switch.

18. The L2 switch of claim 10, further comprising:
an interface of the PBN routing instance to receive an L2 packet from a Virtual Local Area Network (VLAN) of the PBN,
wherein the PBN routing instance identifies a source customer L2 network address specified by the L2 packet received from the VLAN of the PBN,
wherein the PBN routing instance updates the L2 network address table controlled by the PBN routing instance to associate the source customer L2 network address with the interface of the PBN routing instance, and
wherein the PBBN routing instance updates the L2 network address table controlled by with the PBBN routing instance to associate the source customer L2 network address with the interface of the PBN routing instance.

19. A network device comprising:
a control unit executing a provider backbone bridged network (PBBN) routing instance and a separate provider bridge network (PBN) routing instance, wherein PBBN routing instance and the PBN routing instance provide a layer two (L2) bridging service between the PBN and the PBBN, wherein the PBBN routing instance defines a first set of interfaces and the PBN routing instance defines a second set of interfaces; and
a plurality of packet-forwarding engine (PFE) configured to forward L2 packets between the interfaces of the PBN routing instance and the PBBN routing instance, wherein the PFEs store an L2 network address table for each of the interfaces to specify L2 network addresses reachable by the interface,
wherein the PFEs are configured to share L2 network addresses between the L2 network address tables of the interfaces of the PBN routing instance and the L2 network address tables of the interfaces of the PBBN routing instance.

* * * * *